(12) United States Patent
Zediker

(10) Patent No.: US 11,654,489 B2
(45) Date of Patent: May 23, 2023

(54) DEVICES, SYSTEMS AND METHODS FOR THREE-DIMENSIONAL PRINTING

(71) Applicant: Nuburu, Inc., Centennial, CO (US)

(72) Inventor: Mark S. Zediker, Castle Rock, CO (US)

(73) Assignee: Nuburu, Inc., Centennial, CO (US)

( * ) Notice: Subject to any disclaimer, the term of this patent is extended or adjusted under 35 U.S.C. 154(b) by 127 days.

(21) Appl. No.: 17/195,412

(22) Filed: Mar. 8, 2021

(65) Prior Publication Data

US 2022/0040765 A1 Feb. 10, 2022

Related U.S. Application Data

(63) Continuation of application No. 14/787,393, filed as application No. PCT/US2014/035928 on Apr. 29, 2014, now Pat. No. 10,940,536.
(Continued)

(51) Int. Cl.
| | |
|---|---|
| *B22F 12/00* | (2021.01) |
| *B23K 26/082* | (2014.01) |
| *B23K 26/06* | (2014.01) |
| *B23K 26/32* | (2014.01) |
| *B29C 64/153* | (2017.01) |
| *B33Y 80/00* | (2015.01) |

(Continued)

(52) U.S. Cl.
CPC .............. *B22F 12/00* (2021.01); *B22F 10/00* (2021.01); *B23K 26/0608* (2013.01); *B23K 26/0648* (2013.01); *B23K 26/0665* (2013.01); *B23K 26/082* (2015.10); *B23K 26/0853* (2013.01); *B23K 26/0876* (2013.01); *B23K 26/32* (2013.01); *B23K 26/342* (2015.10); *B29C 64/153* (2017.08); *B33Y 10/00* (2014.12); *B33Y 30/00* (2014.12); *B33Y 50/02* (2014.12); *B33Y 80/00* (2014.12); *B22F 10/10* (2021.01); *B23K 2103/04* (2018.08); *B23K 2103/08* (2018.08); *B23K 2103/12* (2018.08); *B23K 2103/14* (2018.08); *B23K 2103/42* (2018.08); *B23K 2103/56* (2018.08); *Y02P 10/25* (2015.11)

(58) Field of Classification Search
CPC .............. B23K 26/082; B23K 26/342; B23K 26/0648; B23K 26/0665; B23K 26/0853; B23K 26/0876; B23K 26/32; B23K 26/34; B23K 2103/42; B23K 2103/56; B23K 2103/04; B23K 2103/08; B23K 2103/12; B23K 2103/14; B22F 3/1055; B22F 2003/1056; B22F 2003/1057; B29C 64/153
See application file for complete search history.

(56) References Cited

U.S. PATENT DOCUMENTS

| | | | |
|---|---|---|---|
| 2011/0267671 A1* | 11/2011 | Peng | ............. H01S 3/115 359/341.1 |
| 2012/0012570 A1* | 1/2012 | Briand | ............. B23K 26/0648 219/121.72 |

(Continued)

*Primary Examiner* — Brian W Jennison
(74) *Attorney, Agent, or Firm* — Glen P. Belvis; Belvis Law, LLC.

(57) ABSTRACT

The present disclosure provides a printer system based on high power, high brightness visible laser source for improved resolution and printing speeds. Visible laser devices based on high power visible laser diodes can be scaled using the stimulated Raman scattering process to create a high power, high brightness visible laser source.

21 Claims, 7 Drawing Sheets

Related U.S. Application Data

(60) Provisional application No. 61/817,311, filed on Apr. 29, 2013.

(51) Int. Cl.

| | | |
|---|---|---|
| *B33Y 50/02* | (2015.01) | |
| *B22F 10/00* | (2021.01) | |
| *B33Y 10/00* | (2015.01) | |
| *B33Y 30/00* | (2015.01) | |
| *B23K 26/342* | (2014.01) | |
| *B23K 26/08* | (2014.01) | |
| *B23K 103/04* | (2006.01) | |
| *B23K 103/14* | (2006.01) | |
| *B23K 103/12* | (2006.01) | |
| *B23K 103/00* | (2006.01) | |
| *B23K 103/08* | (2006.01) | |
| *B22F 10/10* | (2021.01) | |

(56) References Cited

U.S. PATENT DOCUMENTS

| | | | |
|---|---|---|---|
| 2012/0285936 A1* | 11/2012 | Urashima | G01B 9/02091 219/121.63 |
| 2013/0148673 A1* | 6/2013 | Creeden | H01S 3/302 372/6 |
| 2013/0162952 A1* | 6/2013 | Lippey | H04N 9/3161 353/121 |
| 2014/0023098 A1* | 1/2014 | Clarkson | H01S 3/08 372/6 |
| 2016/0067780 A1* | 3/2016 | Zediker | B23K 26/0608 219/76.12 |
| 2016/0067827 A1* | 3/2016 | Zediker | B23K 26/342 219/76.12 |
| 2016/0322777 A1* | 11/2016 | Zediker | H01S 3/30 |

\* cited by examiner

DEVICES, SYSTEMS AND METHODS FOR THREE-DIMENSIONAL PRINTING

CROSS-REFERENCE

This application is a continuation of U.S. patent application Ser. No. 14/787,393 filed Oct. 27, 2015, which is a US nationalization pursuant to 35 U.S.C. § 371 of PCT/US2014/035928 filed Apr. 29, 2014, which claims priority to U.S. Provisional Patent Application Ser. No. 61/817,311, filed Apr. 29, 2013, the entire disclosures of each of which is entirely incorporated herein by reference.

BACKGROUND

Three-dimensional (3D) printing is a manufacturing process of making a three-dimensional solid object from a digital model. 3D printing is typically achieved using an additive process, where successive layers of material are laid down in different shapes. 3D printing is distinct from traditional machining techniques, which may rely on the removal of material by methods such as cutting or drilling (subtractive processes).

Various additive processes are currently available. They differ in the way layers are deposited to create parts and in the materials that can be used. Some methods melt or soften material to produce the layers, e.g. selective laser melting (SLM) or direct metal laser sintering (DMLS), selective laser sintering (SLS), fused deposition modeling (FDM), while others cure liquid materials using different sophisticated technologies, e.g., stereolithography (SLA). With laminated object manufacturing (LOM), thin layers are cut to shape and joined together (e.g., paper, polymer, metal).

While such approaches provide for the formation of 3D objects, there are limitations associated with such approaches. Such approaches typically use laser light with wavelengths in the infrared (IR) portion of the electromagnetic spectrum—e.g., wavelengths greater than 1 micrometer. This may make it difficult to form objects at submicron resolution. In addition, typical 3D printing systems are slow and are incapable of generating objects with low surface roughness, which makes such 3D printed objects unsuitable for numerous end uses.

SUMMARY

Recognized herein is the need for improved three-dimensional (also "3D" and "3-D" herein) printing systems and methods. In particular, there is the need to address the slow manufacturing speed, low feature resolution and high surface roughness of the part, as may be the case with the use of infrared (IR) lasers to manufacture components on a layer by layer basis. The present invention addresses these and other needs, by providing the manufacture, devices and processes taught herein.

The present disclosure provides methods, devices and systems for the fabrication of parts or components by fusing a layer of material with a visible laser system to achieve a high volumetric build rate with high resolution. Devices and systems of the present disclosure employ the use of visible lasers for three-dimensional printing applications. Devices and systems provided herein can simultaneously or substantially simultaneously achieve the resolution and build rates required for using a laser based 3D printer in production.

The present disclosure provides a three-dimensional printing system that uses a visible laser source to produce a substantially small spot size for a given final focusing optic. A 3-D laser sintering system or 3-D laser printing system uses a pair of scanners, which can be a mechanical stepping device, a galvanometer or a similar mechanism for scanning the angle of incidence on the final focusing objective to produce a translation of the laser beam in the focal plane of the objective lens. The objective lens can be an f-theta lens or similar multi-element lens design which can produce a consistent laser spot size over the printing plane. The spot size on the printing plane can be determined by the diameter of the collimated laser beam, the focal length of the objective lens and the wavelength of the laser source. Thus, the wavelength of the laser source is an important parameter in the system because it ultimately defines the minimum spot size and the volume that can be scanned.

The print plane can be a bed of powder metal, a photopolymer that can be cured or a polymer that can be flowed or cured with the application of heat. A layer of powder can be pre-placed with a roller or blade type system, or through direct deposition using a powder delivery nozzle that is coaxial with the laser beam but delivered around the periphery of the beam.

There are at least two methods for generating high power, high brightness laser sources operating in the visible regime: 1) frequency doubling of an infrared laser source in a non-linear crystal such as potassium titanyl phosphate (KTP) or periodically poled Lithium Niobate ($LiNbO_3$), or 2) upconversion operation of a fiber laser, where multiple infrared photons are absorbed by a rare earth ion, such as erbium (Er) or thulium (Tm), resulting in a high energy state being populated and leading to oscillation at a visible wavelength, such as green for erbium and blue for thulium. The frequency doubling of an infrared laser may be difficult to scale up to high power levels because of the low damage threshold of the KTP or lithium niobate crystals used in the doubling process. Consequently, lasers based on doubling techniques may be limited to less than 200 Watts with a single mode output. The second technique, upconversion in a fiber laser may also be limited in output power because of the tendency of the fibers to suffer color center formation due to the high energy photons present in the doped fiber. In addition, there are higher lying states in these upconversion layers which may be populated and may produce UV photons, which may lead to the formation of even more rapid color centers, which are broad band absorption centers formed in the fiber by the high energy of the photons resulting in the losses in the fiber exceeding the potential gain produced by the upconversion process and prohibiting laser operation.

The present disclosure provides devices, systems and methods for generating high power, high brightness visible laser radiation. Such devices and systems can include multiple modules, each configured to perform a given function. In some embodiments, a device for generating visible laser radiation comprises an array of visible laser diodes, a beam forming system and a beam convertor that uses stimulated Raman scattering (SRS) to combine the outputs of the individual laser diodes into a single mode output. The outputs of the visible laser diodes can be concentrated into a fiber sufficiently small in diameter to generate gain from the SRS process to enable laser operation on the first Raman order shifted wavelength.

Moreover, there is provided a visible diode laser system comprising a modular plate design with each laser diode mounted in a TO56 case, a collimating optic, a beam circularizing optic for making the divergence of the collimated source symmetric, a beam shaping optical system that compresses an array of beamlets to eliminate dead space between each of the individual laser sources, and a module for interlacing each of the beams from the modular plate. If the laser diode is collimated in one axis, then a cylindrical lens may be used to collimate the other axis to make the divergence of both axes either equal or not equal, depending on the spot that needs to be created with the final focusing optic.

or a combination thereof. Example materials include, without limitation, steel, titanium, copper, bronze, gold, and alloys of these materials.

The absorption characteristics of materials can increase with decreasing wavelength. As a consequence, there may be a significant increase in the processing speed when using a blue laser wavelength compared to an IR laser (see Table 1 below).

TABLE 1

| Laser System | Absorption | | | | | Processing Speed Advantage | | | | |
| --- | --- | --- | --- | --- | --- | --- | --- | --- | --- | --- |
|  | Aluminum (Al) | Steel (St) | Copper (Cu) | Gold (Au) | Ni | Aluminum (Al) | Steel (St) | Copper (Cu) | Gold (Au) | Ni |
| Blue Laser | 32% | 67% | 58% | 60% | 65% | 200% | 129% | 967% | 3000% | 144% |
| Fiber Laser | 16% | 52% | 6% | 2% | 45% |  |  |  |  |  |

The laser beams from each plate of laser diodes may be vertically interlaced to fill the empty space due to the mechanical properties of the system prior to launch into the final beam focusing optic. As used herein, unless specified otherwise, interlace refers to placing a beam from different sources adjacent to each other and alternating the source from which the beams emerge when the two sources are aligned either vertically or horizontally, so as to eliminate the dead space between the beams prior to launching into a downstream (in some cases final) optic of the system. In some situations, the beam focusing optic can be a best form lens, a multi-element lens corrected for spherical aberrations, an achromatic lens for compensating for any chromatic aberrations, or an asphere with a low f-number (or focal ratio) to enable a large collection aperture for focusing into an optical fiber. As used herein, unless specified otherwise, an asphere is a lens with a non-spherical profile defined by a Zernike polynomial to equalize the path length of all rays passing through the aperture of the lens regardless of the position in the aperture.

Additionally, there is provided an optical fiber with triple cladding for collecting optical pump light from the laser diode array, a low loss (e.g., less than 50 decibels/kilometer (db/km), 40 db/km, 30 db/km, 20 db/km, or 10 db/km) cladding for propagating the incoherent pump radiation from the visible laser diodes and a low loss single mode core (e.g., less than 50 db/km, 40 db/km, 30 db/km, 20 db/km, or 10 db/km). The visible laser diode radiation can be confined in the outer cladding but randomly transverses the central core to create gain in the core through the SRS process. At a sufficient intensity for the visible laser diodes, the gain may exceed the losses in the fiber, and when combined with feedback from either external mirrors, embedded gratings or external gratings, can be made to oscillate on a single transverse mode with multi-axial or single-axial mode operation. This technique may not have been realized in the past because of the high loss (e.g., greater than or equal to about 50 dB/km) typical of most optical fibers in the visible spectrum. Optical fibers of the present disclosure may advantageously minimize Rayleigh scattering in the fiber to enable SRS gain to exceed the losses in the optical fiber.

Additionally the present disclosure provides a method of performing a high power laser operation on a target material to fuse the material together, to cure the materials or to ablate the material, which can be used to form a multilayered 3D object. The material can be any of a number of materials, such as a metallic material, insulating material, semiconducting material, polymeric material, a composite material, An aspect of the present disclosure provides a printing system for forming a three-dimensional object, comprising a laser light source that generates a coherent beam of visible light by stimulated Raman scattering, a substrate in optical communication with the laser light source, and a scanning module downstream of the laser light source. The scanning module can be adapted to generate a scanning motion of the coherent beam of visible light with respect to the substrate, which scanning motion corresponds to a predetermined shape of the three-dimensional object. The printing system can further comprise a computer control system operatively coupled to the laser light source and the scanning module. The computer control system can be programmed to (i) control the scanning motion in a predetermined manner and (ii) modulate a power of the laser light source, to form the object from the substrate.

Another aspect of the present disclosure provides a printing system for forming a three-dimensional object, comprising a laser light source that comprises at least one optical fiber that outputs a coherent beam of visible light in the optical fiber with a Rayleigh loss that is less than about 50 decibels per kilometer (db/km), a substrate (e.g., powder) in optical communication with the laser light source, and a scanning module downstream of the laser light source, wherein the scanning module is adapted to generate a predetermined scanning motion of the beam of visible light with respect to the substrate. The predetermined scanning motion can correspond to a shape of the three-dimensional object. The printing system can further comprise a computer control system operatively coupled to the laser light source and the scanning module. The computer control system can be programmed to (i) control the scanning motion in a predetermined manner and (ii) modulate a power of the laser light source, to form the object from the substrate.

Another aspect of the present disclosure provides a method for forming a three-dimensional object, comprising providing a laser light source and a scanning module optically downstream of the laser light source, and using the laser light source, generating a coherent beam of visible light by stimulated Raman scattering. Next, the coherent beam of visible light is directed to a substrate that is in optical communication with the laser light source. A feature is then generated in or from the substrate. The feature can correspond to at least a portion of a predetermined shape of the three-dimensional object. Next, the scanning module is used to generate a scanning motion of the coherent beam of visible light with respect to the substrate. The scanning motion can correspond to the predetermined shape of the three-dimensional object. The substrate is then moved relative to the laser light source along a direction that is generally parallel to the coherent beam of visible light.

Another aspect of the present disclosure provides a computer-readable medium (e.g., memory) comprising machine executable code that, upon execution by the one or more computer processors, implements any of the methods above and elsewhere herein.

Another aspect of the present disclosure provides a computer system comprising one or more computer processors and memory coupled thereto. The memory comprises machine executable code that, upon execution by the one or more computer processors, implements any of the methods above and elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
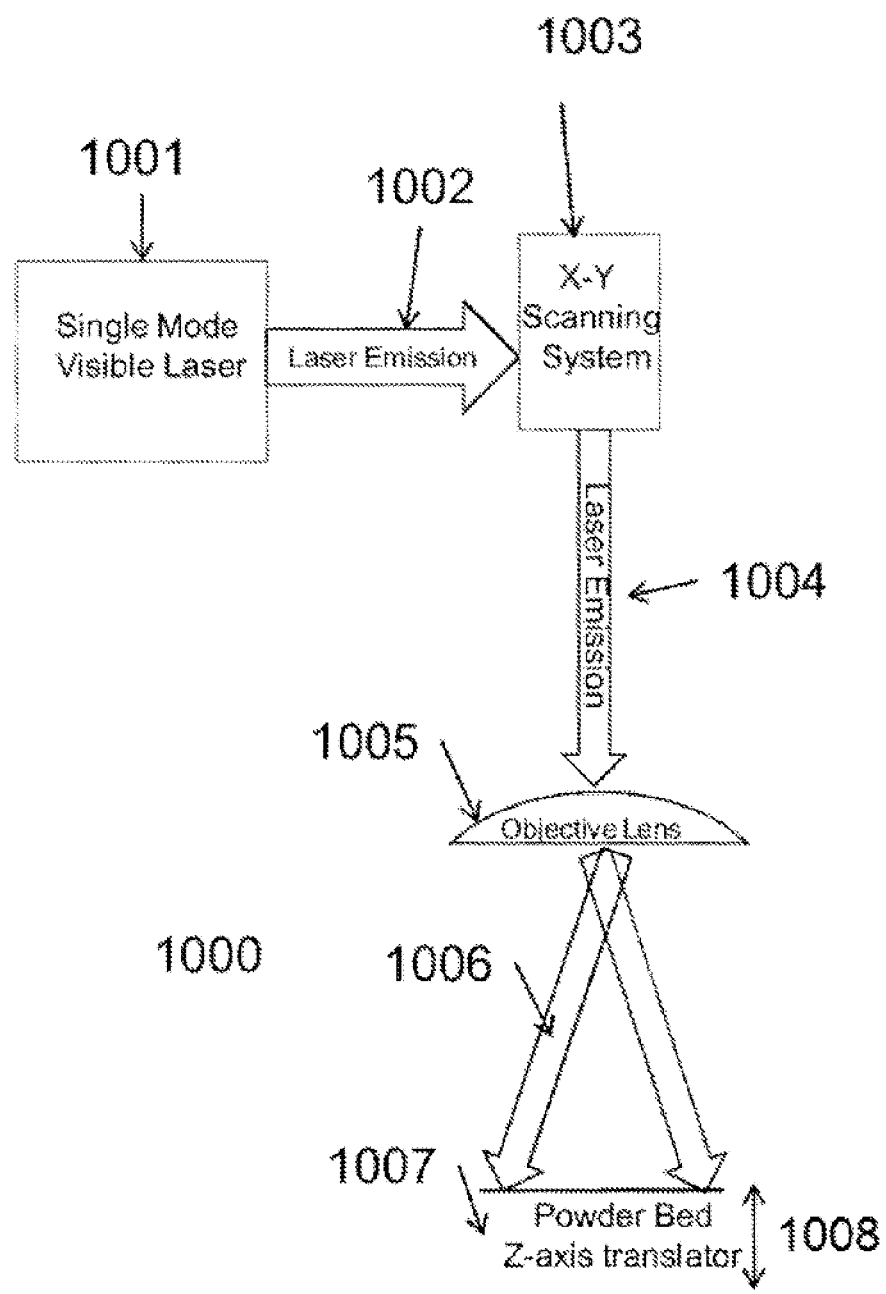
FIG. 1 is a schematic view of an embodiment of a three-dimensional (also "3-D" and "3D" herein) printing system based on scanners and an f-theta lens using a visible laser source.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "visible light," as used herein, generally refers electromagnetic radiation (light) with a wavelength between about 380 nanometers (nm) and 760 nm (400-790 terahertz). Visible light is visible by the human eye. Visible laser light has a wavelength between about 380 nm and 760 nm.

The term "high power laser energy," as used herein, generally refers to a laser beam having at least about 200 Watts (W) of power.

The term "substantial power loss," as used herein, generally refers to a loss of power that is greater than about 10 dB/km (decibel/kilometer) for the visible wavelength.

The term "visible wavelength," as used herein, generally refers to a laser beam with a wavelength greater than 400 nm but less than 750 nm.

The term "high brightness," as used herein, generally refers to single mode laser operation with diffraction limited or near diffraction limited performance.

The term "beamlet," as used herein, generally refers to a beam of electromagnetic radiation from a single laser diode source that may be collimated in one axis or in two orthogonal axes.

The term "interlace," as used herein, generally refers to placing a beam from different sources adjacent to each other and alternating the source from which the beams emerge when the two sources are aligned either vertically or horizontally, so as to eliminate the dead space between the beams prior to launching into a downstream (in some cases final) optic of the system.

The term "f-number" (also focal ratio, f-ratio, f-stop, and relative aperture), as used herein, generally refers to the ratio of the focal length to the diameter of the entrance pupil of the lens of an optical system.

The term "asphere," as used herein, generally refers to a lens with a non-spherical profile defined by a Zernike polynomial to equalize the path length of all rays passing through the aperture of the lens regardless of the position in the aperture. Zernlike polynomials are a sequence of polynomials that are orthogonal on the unit disk.

The term "build volume," as used herein, generally refers to the volume of an object under fabrication, such as a 3D printed object, which, for example, can be scanned by a laser beam with a lateral extent "x", a transverse extent "y" and a vertical extent "z". The vertical extent can be defined by an elevator which incrementally translates the printed object in the "z" direction after each layer is processed.

The term "single mode," as used herein, generally refers to near diffraction limited performance of a laser system with a low $M^2$ value, where $M^2$ defines the beam caustic and how close the laser beam comes to diffraction limited performance. As used herein, unless specified otherwise, $M^2$ is defined as the number of times diffraction limited the beam is and can be equal to or greater than about 1, or greater than or equal to about 1.1 but still single transverse mode, or greater than or equal to about 1.3 but still single transverse mode.

The term "stimulated Raman scattering," as used herein, generally refers to a process in which the photons scatter off of molecules of a fiber to either a lower energy state (Stokes shift) or a higher energy state (Anti-Stokes shift) to create gain in the optical medium. In a laser beam of photons, some Stokes photons may have been previously generated by spontaneous Raman scattering (and may remain in the material), or some Stokes photons ("signal light") may have been deliberately injected together with the original light ("pump light"). Generally, when photons are scattered from an atom or molecule, most photons are elastically scattered (Rayleigh scattering), such that the scattered photons have the same energy (frequency and wavelength) as the incident photons. A small fraction of the scattered photons (e.g., approximately 1 in 10 million) are scattered by an excitation, with the scattered photons having a frequency different from, and usually lower than, that of the incident photons. In a gas, Raman scattering can occur with a change in energy of a molecule due to a transition from one energy state to another. The Raman-scattering process can take place spontaneously; i.e., in random time intervals, one of the many incoming photons is scattered by the material. This process may be referred to as "spontaneous Raman scattering." In stimulated Raman scattering (also "SRS" herein), the total Raman-scattering rate can be increased beyond that of spontaneous Raman scattering: pump photons can be converted more rapidly into additional Stokes photons. The more Stokes photons are already present, the faster more of them are added. This can effectively amplify the Stokes light in the presence of the pump light, which can be exploited in Raman amplifiers and Raman lasers.

Three-Dimensional Printing Devices, Systems and Methods

The present disclosure provides devices, systems and methods for applying directed energy to a layer of material to fuse or ablate the material in the creation of an object (or part) directly from a computer design. This can be used to generate or print a three-dimensional object, such as in a layer-by-layer fashion. Methods provided herein can accomplish the consolidation of powder material into a working part, or the fusing of a binder into a part that has to be post processed to complete the consolidation of the part.

Devices, systems and methods of the present disclosure can be used to form various objects or parts, such as objects for consumer or industrial uses. Such objects can be digitally designed on a computer system, and fabricated using devices and systems provided herein. In some examples, devices, systems and methods of the present disclosure can be used to form consumer parts (e.g., toys), electronics components, medical devices, or components of industrial or military equipment. Devices, systems and methods of the present disclosure can have various applications, such as consumer, educational, industrial, medical and military applications. In an industrial setting, devices, systems and methods provided herein can be used for material processing.

Devices, systems and methods of the present disclosure can employ the use of visible lasers to generate objects at high precision and in a time scale that is much less than other systems currently available. In some cases, this is based on the unexpected realization that stimulated Raman scattering (SRS) can be used to generate a highly coherent beam of visible laser light in a single mode output. Such lasers can be operated as a high resolution laser projector or a supercontinuum laser.

FIG. 1 is a schematic of the 3-D laser printing system based on a high power visible laser system. The system includes a single mode visible laser source (1001). The visible laser source (1001) can include one or more visible laser diodes. The output (1002) of the visible laser (1001) can be directed at a pair of scanners (1003) that scan the beam in orthogonal directions. The scanners (1003) can be a pair of galvanometers which scan the laser beam across the focal plane in either an X-Y raster pattern or a vector scanning pattern. The scanners (1003) can create an angular deviation from orthogonal, which can produce a translation of the laser spot in the focal plane. Laser emission reflected (1004) by the scanners (1003) can be directed to an objective lens (1005), which generates a focused beam (1006) that can be directed to a substrate (1007), such as a powder. In some examples, the substrate (1007) is a powder in a powder bed. This can melt or fuse the substrate (1007) at the focal point of the laser beam.

The scanners (1003) can be used to raster the laser emission (1004) over the powder (1007) in a manner that defines the two-dimensional and three-dimensional shape of a three-dimensional object under fabrication. This can be performed in a layer-by-layer fashion. At a given layer, the two-dimensional shape of the object in that layer is defined using the laser emission (1004). The two-dimensional shape of the object at each successive layer can be defined using the laser emission (1004) to generate the overall 3-D shape of the object.

Various parameters of the laser emission (1004) can be selected to provide a desired shape of the object. Such parameters include, without limitation, exposure time and laser power. For example, the time that the substrate (1007) is exposed to the laser emission (1004) can be selected based on a melt or fuse rate of the material of the substrate (1007).

The substrate (1007) can be supported by or on a substrate holder. The substrate holder can include a vertical translator ("Z-axis translator," as shown in FIG. 1) (1008) to move the object vertically (i.e., parallel to the general direction of propagation of laser light) during layer-by-layer fabrication or growth of the object. The vertical translator can be a motor, such as a step motor. The vertical translator (or elevator) can step the substrate in increments of at least about 5 nanometers (nm), 10 nm, 20 nm, 30 nm, 40 nm, 50 nm, 100 nm, 200 nm, 300 nm, 400 nm, 500 nm, 1 micrometer ($\mu$m), 2 $\mu$m, 3 $\mu$m, 4 $\mu$m, 5 $\mu$m, 10 $\mu$m, 20 $\mu$m, 30 $\mu$m, 40 $\mu$m, or 50 $\mu$m during fabrication of the object.

As an alternative, or in addition to, an assembly (e.g., TO56 case) comprising visible laser (1001), scanners (1003) and objective lens (1005) can be moved vertically with respect to the substrate (1007). The assembly can include a vertical translator that can step the assembly in increments of at least about 5 nanometers (nm), 10 nm, 20 nm, 30 nm, 40 nm, 50 nm, 100 nm, 200 nm, 300 nm, 400 nm, 500 nm, 1 micrometer ($\mu$m), 2 $\mu$m, 3 $\mu$m, 4 $\mu$m, 5 $\mu$m, 10 $\mu$m, 20 $\mu$m, 30 $\mu$m, 40 $\mu$m, or 50 $\mu$m during fabrication of the object.

The diameter of the laser spot formed in FIG. 1 can be determined by the focal length of the objective lens (1005), the beam size on the objective lens (1005) and the wavelength of the laser beam. The build volume may be limited by the diameter of the objective lens and the size of the beam on the objective including the translations due to the scanners. The spot size in an IR based system is approximately 70 micrometers ($\mu$m) with a build volume of 9.6"×9.6"×11" (Table 2) due to the finite size of the beam on the objective lens. A blue laser system with a wavelength of 459 nm can advantageously create a spot size that is less than or equal to about 35 $\mu$m, in some cases with the same optical system as the IR system. Since the optical system can be the same, the build volume remains unchanged but the resolution and surface quality is improved by better than a factor of 1, 1.1, 1.2, 1.3, 1.4, 1.5, 2. 3, 4, 5, 6, 7, 8, 9, or 10. If the blue laser system based 3-D printer final focusing lens is changed to produce a 70 $\mu$m spot, then the same resolution is achieved as the IR system, but now the build volume can be increased by a factor of 150×.

TABLE 2

| Performance | Current IR Laser | Blue Laser System |
| --- | --- | --- |
| Power | 2000 W | 1000 W |
| Print Speed | 20 cc/hr | 50 cc/hr |
| Resolution | 70 um | 70 um |
| Build Volume | 9.8" × 9.8" × 11" | 53" × 53" × 55" |
| Surface Finish | ~2Ra | ~2Ra |

Figure 2:
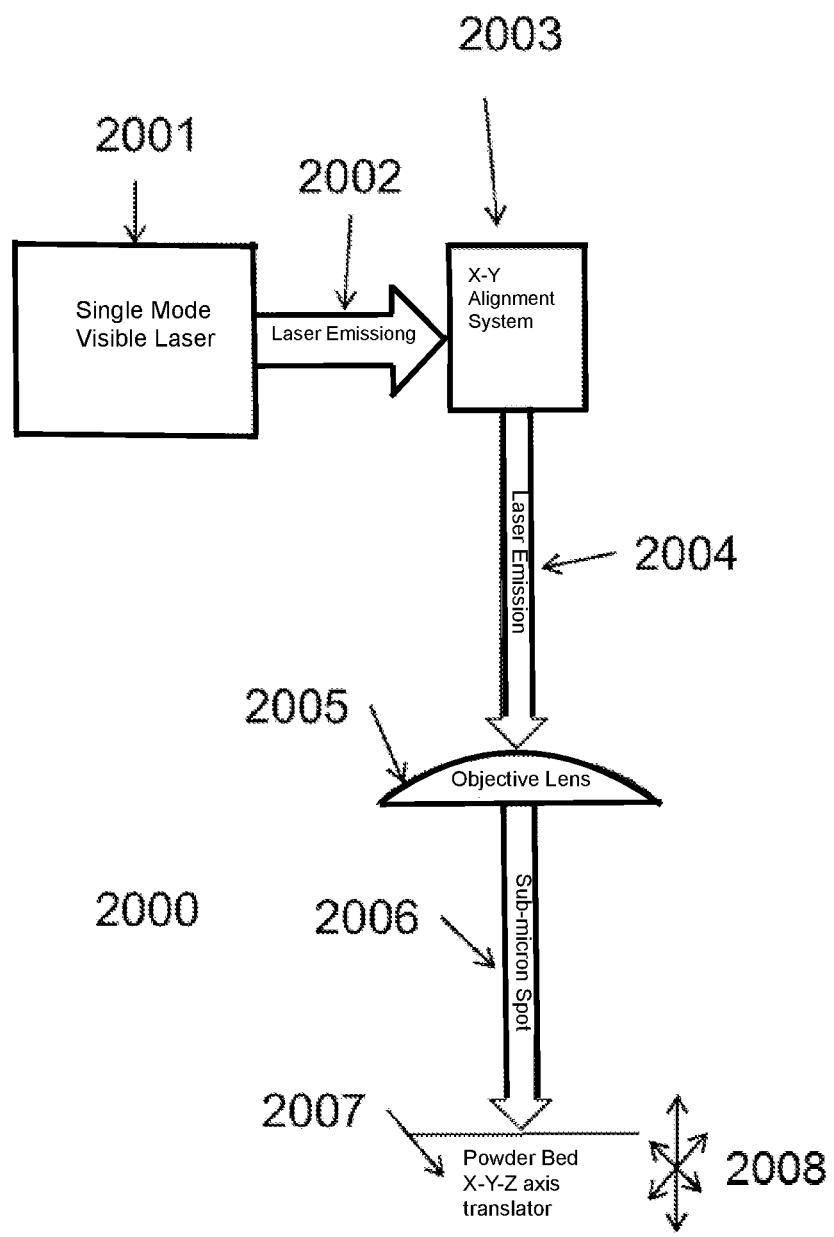
FIG. 2. Is a schematic view of an embodiment of a 3-D printing system using linear translation stages with a visible laser source.

Alternatively looking at FIG. 2, a 3-D printer in this embodiment is based on a pair of linear translation stages instead of scanners for printing the pattern. The linear translation stages change the fundamental geometry governing the spot size and the writing speed and opens up the ability to use a sufficiently short focal length lens such that the spot size is less than 1000 nanometers (nm), 900 nm, 800 nm, 700 nm, 600 nm, or 500 nm. This sub-micron spot size may be suitable for the direct manufacture of Micro-Electrical-Mechanical (MEMS) devices. The laser beams (2002, 2004 and 2006) can be translated across the surface of a substrate (e.g., powder) using a translation stage (2007) to directly write a pattern in either a substrate or with the direct injection of the substrate into the beam with a coaxial nozzle. The resolution of the part can be the result of the small diameter beam and the size of the substrate, such as the nanometer scale powder (e.g., 50 nm) used to directly write the part.

The translation stage (2007) can enable the substrate to be translated in an X-Y plane (orthogonal to the general direction of propagation of laser light), and/or along a Z-axis, which may be parallel to the general direction of propagation of laser light. The translation stage (2007) can include two linear sub-stages. The translation stage (2007) can be part of a substrate holder, which can be configured to support the substrate during fabrication of the object. A translation stage can include a motor, such as a step motor. The translation stage (2007) can include a vertical translator (2008) that can translate the stage along the Z-axis during fabrication. The vertical translator (or elevator) can step the substrate in increments of at least about 5 nanometers (nm), 10 nm, 20 nm, 30 nm, 40 nm, 50 nm, 100 nm, 200 nm, 300 nm, 400 nm, 500 nm, 1 micrometer (μm), 2 μm, 3 μm, 4 μm, 5 μm, 10 μm, 20 μm, 30 μm, 40 μm, or 50 μm during fabrication.

As an alternative, or in addition to, an assembly comprising visible laser (2001), x-y alignment system (2003) and objective lens (2005) can be moved vertically with respect to the substrate, which may be situated at the stage (2007). The assembly can include a vertical translator that can step the assembly in increments of at least about 5 nanometers (nm), 10 nm, 20 nm, 30 nm, 40 nm, 50 nm, 100 nm, 200 nm, 300 nm, 400 nm, 500 nm, 1 micrometer (μm), 2 μm, 3 μm, 4 μm, 5 μm, 10 μm, 20 μm, 30 μm, 40 μm, or 50 μm during fabrication of the object.

In some embodiments, the laser (2001) and objective lens (2002-2005) are translated as a subsystem across the substrate as the power in the beam is modulated, thereby defining the part layer by layer. The laser (2001) can be a single mode visible laser. The laser (2001) can include one or more visible laser diodes. For example, the power in the beam is modulated by turning laser power on or off, or increasing and decreasing laser power in a manner that is predetermined based on the shape of the part (or object) being fabricated. As an alternative, the laser can be stationary, and an optical head is translated across the part taking advantage of the highly collimated nature of the laser beam. Such flying optic head technique may include components as currently used in $CO_2$ flat sheet bed cutters. See, e.g., Todd, Robert H.; Allen, Dell K.; Alting, Leo (1994). Manufacturing Processes Reference Guide. Industrial Press Inc. ISBN 0-8311-3049-0, which is entirely incorporated herein by reference.

The speed of fabrication or manufacturing can be improved in many systems today with a laser capable of being modulated at a much higher rate than today's fiber lasers. When writing an object (or part), the scanning speed and the laser power can determine how fast the beam can be moved for a given material. However, as the laser beam is moved across a substrate (e.g., powder in a power bed), it may be necessary to turn the laser off when there is not supposed to be any structure present in the part at the particular point in the layer being printed. The faster the beam is scanned across the substrate surface and the smaller the feature size, the faster the laser beam has to be turned on and off. The laser described in this application is capable of being modulated at substantially high modulation rates. The substantially high modulation rate can improve the surface characteristics (e.g., roughness) of the part being manufactured as well as enable very high spatial resolution components to be manufactured.

Infrared (IR) lasers used today may be limited to a modulation rate of 50 kHz (1 kHz=1000 cycles per second). However, visible light laser (e.g., blue laser) based devices and systems of the present disclosure are capable of being modulated at rates greater than or equal to about 50 kHz, 100 kHz, 200 kHz, 300 kHz, 400 kHz, 500 kHz, 1 GHz (1 GHz=1000 kHz), 2 GHz, 3 GHz, 4 GHz, 5 GHz, or 10 GHz. To achieve production rates with this type of a system, multiple devices can be processed in parallel with the same laser system using a high speed beam sharing switch or with parallel laser systems synchronized to the motion system. An example switch is a multi-port beam switch, such as, for example, a multi-port beam switch comprising 2, 3, 4, 5 or 6 channels.

Visible light laser based devices and systems of the present disclosure can be used to form objects (or parts) having substantially smooth surfaces. In some cases, the surface roughness of an object (or part) formed using devices and systems of the present disclosure can be between about 0.1 nm and 50 nm, or 1 nm and 20 nm, or 1 nm and 10 nm, as measured by transmission electron microscopy (TEM).

Visible light laser based devices and systems of the present disclosure can be used to form objects (or parts) having substantially high aspect ratios (e.g., length divided by width). In some cases, the aspect ratio of a feature in an object (or part) formed using devices and systems of the present disclosure may be at least about 1.1:1, 1.2:1, 1.3:1, 1.4:1, 1.5:1, or 2:1, or 5:1, or 10:1, or 20:1, 50:1, 100:1 or more.

Device and systems of the present disclosure can employ visible laser sources scaled to high power and high brightness. A high power laser source can have a power greater than about 100 Watts, or greater than about 200 Watts, or greater than about 300 Watts, or greater than about 400 Watts, or greater than about 500 Watts, or greater than about 1,000 Watts, or greater than about 2,000 Watts. Laser sources of the present disclosure can operate in single mode, which can include near diffraction limited performance from the laser system with a low $M^2$ value, where $M^2$ defines the beam caustic and how close the laser beam comes to diffraction limited performance. As used herein, unless specified otherwise, $M^2$ is defined as the number of times diffraction limited the beam is and can be equal to or greater than about 1, greater than or equal to about 1.1 but still single transverse mode, or greater than or equal to about 1.3 but still single transverse mode.

Figure 3:
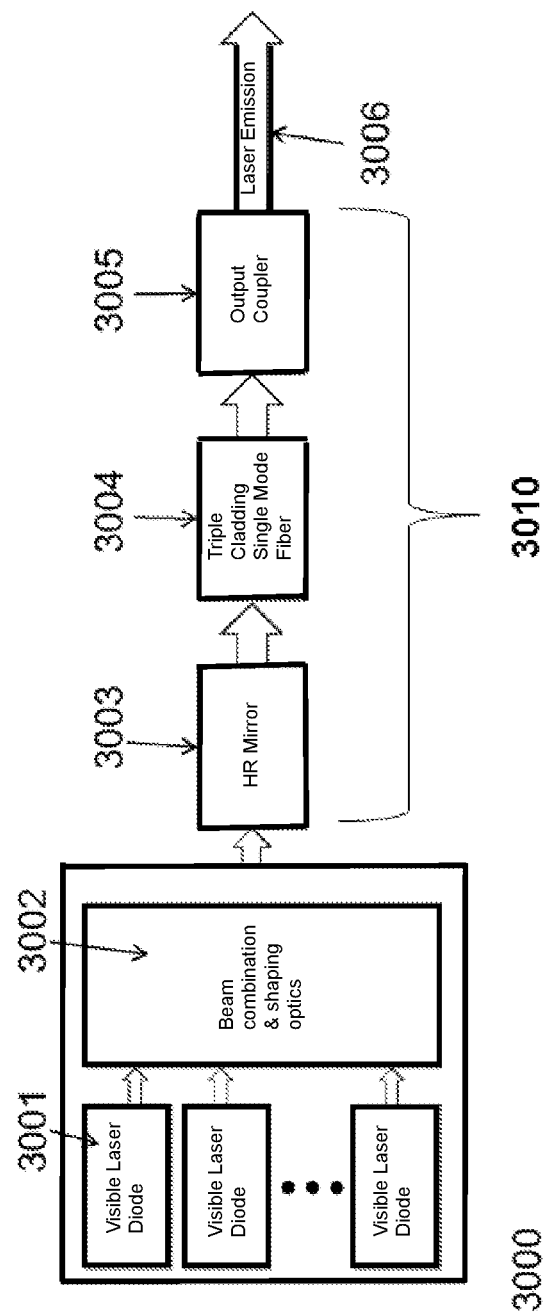
FIG. 3 is a schematic view of an embodiment of a visible laser source.

FIG. 3 shows a high power, single mode visible laser source (3000), in accordance with some embodiments of the invention. The laser (3000) includes an array of high power, high brightness visible laser diodes (3001). Visible laser light from the diodes (3001) can be collimated and shaped into a beam by a beam combination and shaping optic assembly (3002) to match the numerical aperture and spot requirements of a Raman convertor fiber or resonator (3010), which comprises a high reflectivity (HR) back mirror (3003), a low loss optical fiber (3004) and a lower reflectivity output coupler (3005). The Raman convertor (3010) converts the power from the plurality of visible laser diodes arranged in a linear or two dimensional array into a single coherent laser beam (3006) using a non-linear approach, such as stimulated Raman scattering (SRS).

In an example, the back mirror (3003) can be a high reflectivity element and the output coupler (3005) can be a cleaved or polished facet with the appropriate dielectric coating. In another example, the back mirror (3003) is a high reflectivity element and the output coupler (3005) is a grating. In another example, the back mirror (3003) is a high reflectivity element and the output coupler (3005) is an embedded Fiber Bragg Grating (FBG). In another example, the back mirror (3003) is an embedded FBG designed to have high reflectivity for the lowest order $TEM_{oo}$ mode and the output coupler (3005) is a cleaved or polished facet with the appropriate dielectric coating. In another example, the back mirror (3003) is an embedded FBG designed to have high reflectivity for the lowest order $TEM_{oo}$ mode and the output coupler (3005) is a grating. In another example, the back mirror (3003) is an external Volume Bragg Grating (VBG) and the output coupler (3005) is a cleaved or polished facet with the appropriate dielectric coating. In another example, the back mirror (3003) is a high reflectivity element and the output coupler (3005) is a lower reflectivity embedded FBG. In another example, the back mirror (3003) is an embedded FBG and the output coupler (3005) is a low reflectivity mirror. In another example, the back mirror (3003) is a VBG and the output coupler (3005) is a cleaved or polished facet with the appropriate dielectric coating. In another example, the back mirror (3003) is a high reflectivity mirror and the output coupler (3005) is a low reflectivity VBG.

The fiber (3010) can be in optical communication with the optic assembly (3002). The fiber (3010) can include a central core that is single mode, or near single mode, a cladding of larger diameter than the core for capturing the output of the visible laser diode array and an outer cladding to guide the visible laser diode array light along the fiber. The central core may have a diameter greater than or equal to about 3 μm, greater than or equal to about 5 μm, greater than or equal to about 15 μm, or greater than or equal to about 25 μm. The first cladding region may have a diameter greater than or equal to about 50 μm, greater than or equal to about 80 μm or greater than or equal to about 100 μm. The outer cladding region may have a diameter greater than the diameter of the inner cladding by a factor greater than or equal to about 1.1, 1.2, 1.3, 1.4, 1.5, 1.6, 1.7, 1.8, 1.9, 2, 3, 4, 5, or 10. In some examples, the outer cladding has a diameter that is greater than or equal to about 55 μm, greater than or equal to about 90 μm, or greater than or equal to about 110 μm. In some situations, in order to provide strength and durability, the outer cladding may have a diameter be greater than or equal to about 125 μm.

The diameter of the first cladding region may be an important parameter in the operation of the visible laser because the intensity of the visible laser (e.g., blue laser) diode light defines the gain that can be generated with the SRS process. The gain for a Raman fiber may be determined by the amount of pump power in the core of the fiber. The power for generating Raman gain can reside in the cladding just outside of the core region. Since the cladding is larger in diameter than the core, the Raman gain for the laser is significantly less than the gain that occurs when all of the power is confined to the core. For example, a 200 Watt visible Raman laser requires the pump power from the array of laser diodes to be able to be launched into the inner cladding region which needs to be on the order of 60 μm in order to achieve sufficient gain for efficient operation. As another example, a 2,000 Watt visible Raman laser requires a cladding diameter of 85-100 μm to achieve efficient operation, which is driven by the ability of the laser diodes that are launched as pump diodes into the outer clad.

Visible laser diodes of the present disclosure may be capable of greater than about 1 Watt of output power from a narrow stripe suitable for launching a plurality of laser diodes into a fiber with a diameter of less than 100 μm. Laser diode brightness is defined as the product of the output power, the stripe width and the divergence angle. The narrow stripe width can be greater than or equal to about 5 μm, greater than or equal to about 10 μm, greater than or equal to about 15 μm, but in some cases no greater than about 35 μm. The divergence angle in the fast axis can be greater than or equal to about 20 degrees, greater than or equal to about 40 degrees, or greater than or equal to about 90 degrees from a laser diode. The divergence angle in the slow axis can be greater than or equal to about 1 degree, greater than or equal to about 10 degrees, or greater than or equal to about 20 degrees. The laser diode can have a fast axis divergence between about 18 and 25 degrees Full Width Half Maximum (FWHM) and a slow axis divergence between about 12 and 15 degrees FWHM. In an example, the laser diode has a fast axis divergence of 25 degrees FWHM and a slow axis divergence of 15 degrees FWHM, which is a source brightness of 20 $MW/cm^2$-steradian. The source brightness defines the maximum number of devices which can be coupled into an optical fiber, the higher the brightness number, the greater the number of devices that can be coupled.

The optical fiber can be a triple clad design as described above, with a substantially low loss in the visible wavelength range due to Rayleigh scattering in both the central single mode core and the first cladding. In some cases, the laser diodes operate at 450 nm and produce gain over a 10 nm range between 451 nm and 461 nm depending on the intrinsic scattering losses in the optical fiber. The fiber can have a Rayleigh scattering loss of less than 10 decibels/km (dB/km) at 459 nm which is substantially lower than a pure silica core fiber which can have losses greater than or equal to 50 dB/km. The Raman gain that is generated may be sufficient to overcome the Rayleigh losses in the fiber, if losses in the fiber are less than about 50 dB/km, less than 40 dB/km, less than 30 dB/km, less than 20 dB/km, less than 10 dB/km, less than 5 dB/km, or less than 1 dB/km. The lower the losses in the fiber, the higher the overall efficiency of the laser.

Figure 4:
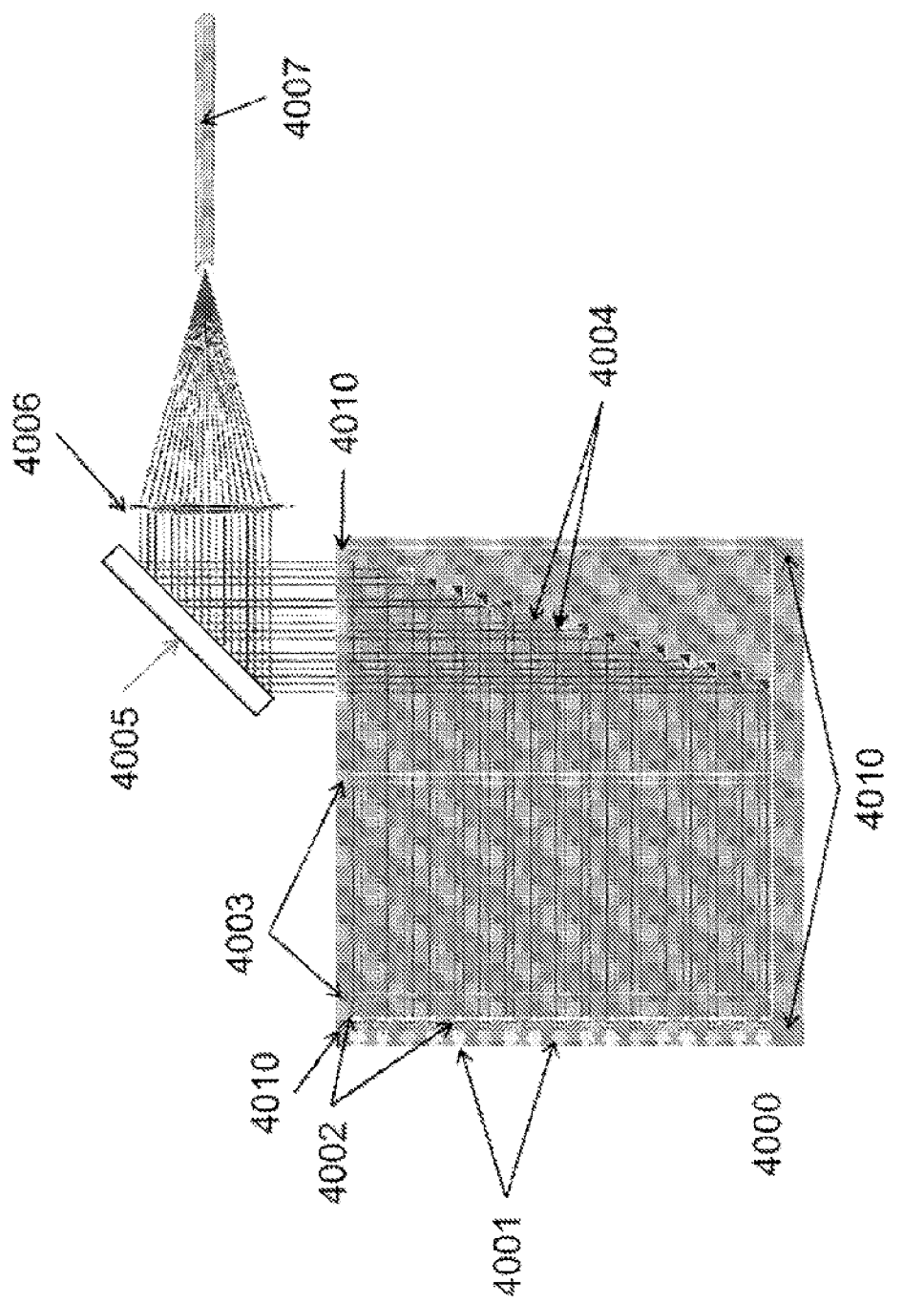
FIG. 4 is a view of an embodiment of a modular laser plate using multiple laser diode sources packaged in a TO56 package.

The laser diode array can be a modular design based on plates which combine and condition the outputs of a linear array of laser diodes. FIG. 4 shows a laser plate that includes a linear array of high power visible laser diodes (4001) with a collimating optic associated with each laser diode to provide collimated sources (4004), as well as a beam shaping optical system (4003), and a set of compressing optical elements (4004) (also "beam compressor" herein) to eliminate the space between the collimated laser sources in one axis.

In an example, the collimating optic is an aspheric cylindrical lens along one axis and the beam shaping optical system (4003) is a cylindrical lens in another axis. In another example, the beam shaping optical system (4003) comprises two optical elements forming a cylindrical telescope to resize one axis of the beamlet.

In some examples, a beam compressor (4004) is a turning mirror or prism. In an example, each beam compressor comprises at least one turning mirror. A turning mirror can be a prism operating in Total Internal Reflection (TIR) mode. In some cases, a turning mirror is a high reflectivity dielectric coated substrate, such as, for example, a dielectric coating on a fused silica substrate which can be 99% reflectivity for unpolarized light at 459 nm, or a metal mirror with enhanced reflectivity coating, such as, for example, an aluminized mirror with an enhanced reflectivity enabling up to 92% reflection for unpolarized light at 459 nm.

In an example, a beam compressor (4004) for each plate comprises a plate with alternating high reflectivity/anti-reflectivity coatings to reflect the beams from each plate or pass the beams from each plate. In another example, a beam compressor (4004) for each plate comprises a stack of prisms oriented to direct the beam from each laser plate to be parallel while minimizing the dead space between the beams from each laser plate. In another example, a beam compressor (4004) for each plate comprises a plate with alternating high reflectivity/holes in the plate to reflect the beams from each plate or to pass the beams from each plate.

In some examples, the beam shaping optical system (4003) comprises one or more anamorphic prims. In an example, the beam shaping optical system (4003) comprises a pair of anamorphic prims.

The compressed beamlets can make up the composite beam that reflect off of an interlacing optic (4005) into the final focusing optic (4006) to deliver the laser power to a pump fiber (4007) or directly to a laser fiber (4007). The laser fiber (4007) can be a triple clad fiber with a single mode core or near single mode core. The laser cavity can be formed with either external mirrors, gratings or Fiber Bragg Gratings (FBG) embedded in the central core. In some embodiments, a laser resonator is based on the embedded FBGs, because the gratings have both spectral and modal selectivity, which enables the Raman laser to operate on a single transverse mode even if the fiber core is multi-mode.

The central core can be a fused silica core which has the lowest Raman gain coefficient compared to a germanium doped core or a phosphorus doped core. The Raman shift for the fused silica and germanium doped core are similar and less than about 12 nm at 450 nm, but the shift for the phosphorus doped core is substantially greater, with up to about a 75 nm shift at 450 nm. The central core can be a fused silica core to minimize the potential for color center generation in the fiber. A dopant may be added to the core to further suppress photo-darkening effects, and the photo-darkening may be minimized by keeping any ultraviolet (UV) components from being generated in the laser cavity. As long as the laser emission is confined to the Stokes scattering component, the wavelength can be longer than the pump wavelength and there will be no UV radiation generated. The gain for the Stokes wave can be substantially larger than for the Anti-Stokes wave, making it less likely that shorter wavelengths will be generated by Anti-Stokes scattering events.

A dopant, such as a material having hydroxyl groups (OH), may be added to the core and the first fiber clad to suppress the Rayleigh scattering losses in the visible regime. The fundamental requirement of any laser system is that the gain in the system may exceed the losses in the system. While the stimulated Raman scattering can provide sufficient gain to overcome the 50 dB/km in standard optical fibers, efficient laser operation can occur when the loss associated with Rayleigh scattering is less than 50 dB/km, less than 40 dB/km, less than 30 dB/km, less than 20 dB/km, less than 10 dB/km, less than 5 dB/km, or less than 1 dB/km.

Scaling the power output of the laser system can be accomplished by stacking the laser plates in FIG. 4 to form a two dimensional array of laser diode beams. For example, the lasers can be mounted on a single cooled plate that can be stacked to form a two dimensional source of laser diode power. The plate can be cooled with a cooling fluid, such as water. In some cases, cooling can be accomplished with the aid of fans, heat fins and/or a heat exchanger employing a cooling fluid.

In some situations, the laser plates are stacked with minimal space between each of the beams produced by each of the plates. The laser plates can be stacked with a dead space equal to the height of the laser beam emitted by the plate.

Figure 5:
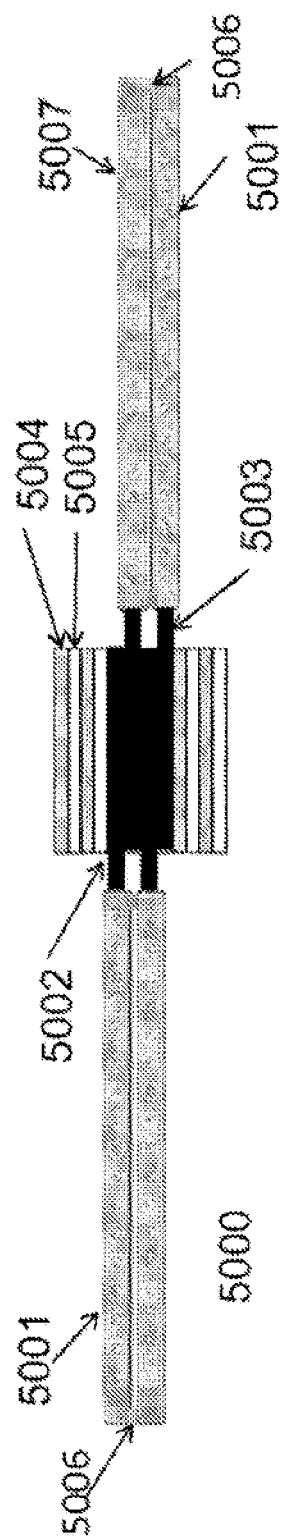
FIG. 5 is a view of an embodiment of multiple modular laser plates stacked to form a two dimensional array of laser sources.

Referring to FIG. 5, a laser system is shown having multiple plates. Each plate has precision ground mounting point to establish the flatness and spacing of each plate (5006). The plates can be physically held together to form a stack of plates. Plates can be physically held together using a mechanical fastening member (e.g., screws) or a chemical fastening member (e.g., an adhesive). Each beam of a plate can be precisely spaced to create a gap where another beam can be interlaced (5002, 5003) to minimize the dead space between the beams launching into the lens (4006). Two arrays of lasers with complimentary spacing (5001, 5007) are used with the beam from each beam plate interlaced between the beams of the other plate. Each array can include a plurality of visible light laser diodes. The laser plates can be identical in design but mounted in opposite directions to enable a common platform throughout the system. The beam combination method (5004, 5005) can be either a stack of prisms or a plate that alternatively transmits or reflects each of the beams. The transmission part of the plate (5005) can be either a hole or an anti-reflection coated region of the plate where the plate is a material such as fused silica or a metal. The reflecting portion of the plate (5004) can be either a dielectric coating or an enhanced metal mirror. Alternatively, a combination method, such as a stack of prisms, can be used in either a refracting configuration or a Total Internal Reflection (TIR) configuration, to alternatively combine the beams from each of the laser plates.

Figure 6A:
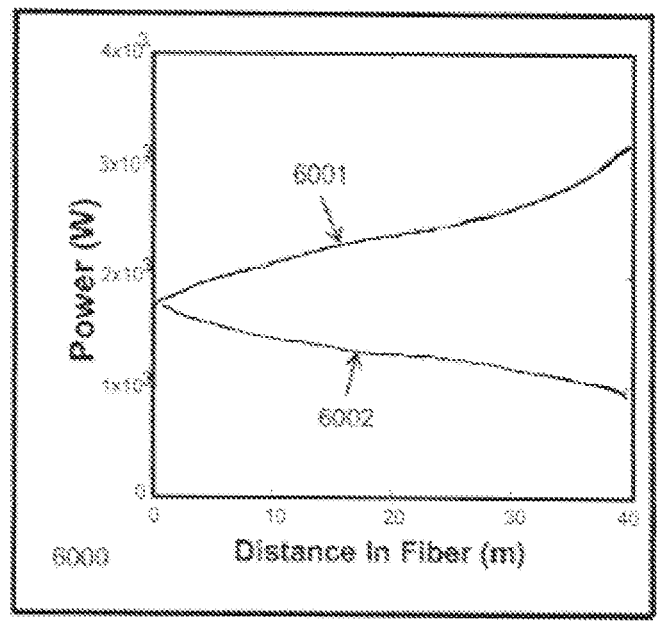
FIGS. 6A-6B schematically illustrate the evolution of pump power into a single mode output.
Figure 6B:
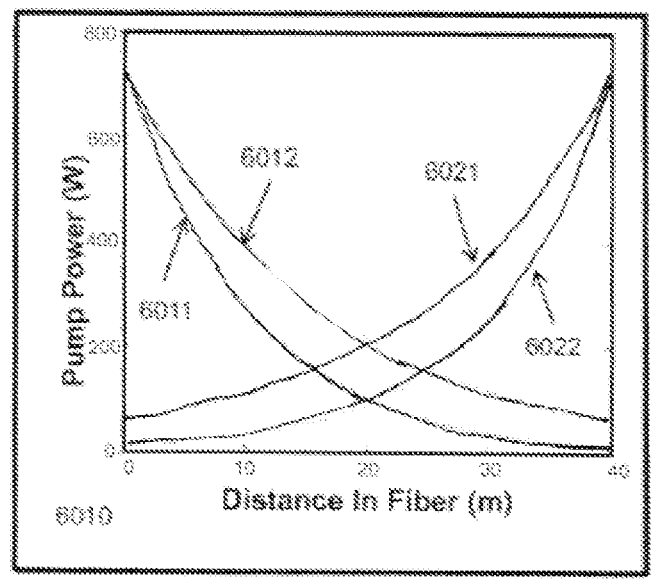

The beams created from the two dimensional array of plates can be highly collimated and can be further combined with other two dimensional arrays of plates using either wavelength or polarization to further increase the pump brightness. With reference to FIGS. 6A and 6B, multiple sources within a wavelength bandwidth of up to 5 nm (6011, 6012) or (6021, 6022) can be used to create gain through the SRS process in a fused silica fiber (6001, 6002). The wavelength pump spectral bandwidth for a plurality of sources can be less than about 4 nm, less than 3 nm, less than 2 nm or less than 1 nm. A substantially wider spectral pump bandwidth for the laser diodes can be used with a phosphorous doped fiber because of the broader gain profile for the fiber. For the case of a phosphorous doped fiber, the spectral pump bandwidth for a plurality of laser sources can be less than about 35 nm, less than 25 nm, less than 15 nm, less than 5 nm or less than 1 nm.

Control Systems

Figure 7:
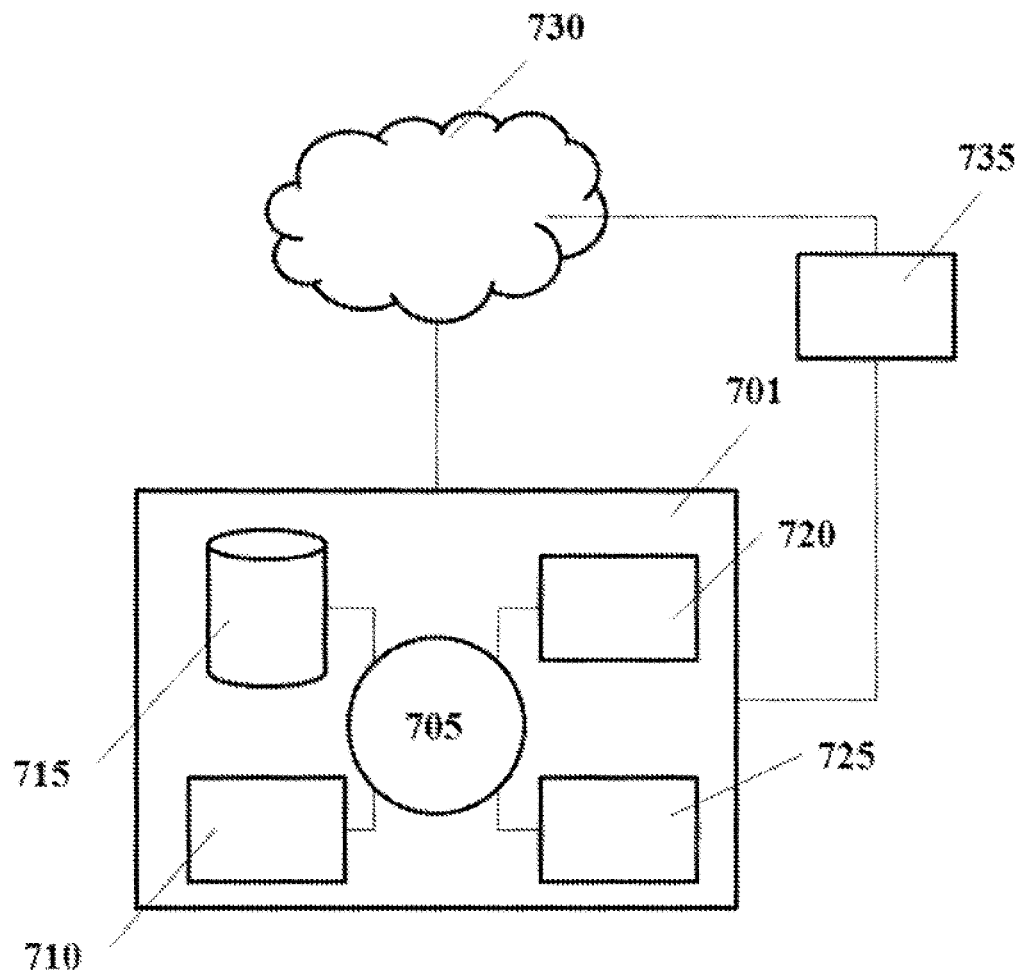
FIG. 7 schematically illustrates a computer system that is programmed or otherwise configured to implement methods of the present disclosure.

Devices, systems and methods of the present disclosure can be implemented using computer control systems. FIG. 7 shows a computer system 701 that is programmed or otherwise configured to regulate the operation of a 3D printing device, system and method of the present disclosure. The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

The computer system 701 can be in communication with a 3-D printing device or system 735. The computer system 701 can be in communication with the 3-D printing device either directly (e.g., by direct wired or wireless connectivity), or through the network 730. The 3-D printing device or system 735 can be any device or system described above and elsewhere herein, such as, for example, the 3-D printing laser system of FIG. 1.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

EXAMPLES

The following examples are provided to illustrate various processes, configurations and systems that may be performed with the high power visible laser source in a 3-D printer system. These examples are for illustrative purposes only and are not intended to limit the scope of the present invention.

Turning to FIG. 1 a 3-D printing system is schematically shown, which includes a computer system and software for converting a solid model directly to a solid part by using laser sintering to fuse a powder substrate layer by layer. The visible laser (1001) in this example includes the laser in FIG. 4 (4000) and the laser plate drawing in FIG. 4 (4000) where the visible laser diodes (4001) are high power, high brightness laser diodes, which output laser light at a wavelength of about 450 nm. An aspheric lens (4002) is used to collimate each of the laser sources and is used during manufacture to align the output beam of each laser on the laser plate. The lasers are aligned with the slow axis perpendicular to the laser plate to allow a cylindrical telescope (4003) to be aligned with the slow axis of the laser diode to circularize the divergence of the beamlet in both the slow and fast axes. The cylindrical telescope (4003) elements are placed during the manufacture process with a pick-and-place machine (e.g., robot), which may be custom or provided by one of several manufactures of such machines. The pick-and-place robot can be capable of placing an optic and orientating it along 6 axes, as well as applying a UV curing adhesive or thermal epoxy for affixing the optic in place. After placement, the system may require no further alignment after being affixed to the plate with an ultraviolet (UV) curable resin. The turning mirrors or prisms (4004) are also put in place by a pick-and-place machine during manufacture, and may require no further alignment after being affixed to the plate with a UV curable resin. The output beams from the laser plates are aligned by adjusting the position of the collimating asphere during manufacturing to form a single spot in the far-field which corresponds to the beamlets being parallel and highly aligned. In some situations, a final focusing optic is an asphere to minimize the laser spot and to maximize the useable aperture of the lens.

The laser plates can be stacked to form a two dimensional beam as shown in FIG. 5 (5000) and interlaced (5002) to form a single beam. The single beam formed from the two interlaced arrays can then be combined using dichroic filters or gratings with the wavelength of the two different sets of arrays being separated by 2 nm. After the two sets of arrays are combined in a dichroic filter, a polarizer can be used to combine a similar set of arrays arranged with their polarization orthogonal to the first set of arrays, thereby resulting in 4 arrays being combined with another 4 arrays to form a beam with an 8× increase in source brightness using wavelength and polarization combination. This approach may have features similar to that described in U.S. Pat. No. 5,715,270 to Zediker et al. ("High efficiency, high power direct diode laser systems and methods therefor"), which is entirely incorporated herein by reference. The polarization combination can be performed either before formation of the composite beam (wavelength combining) or after. The composite beam is then launched into the pump core of a triple clad fiber (4007, FIG. 4) with a fused silica core. The high intensity beam in the pump core to create gain through the SRS process in both the cladding and the core. However, the core has a laser cavity associated with it (3003 and 3005, FIG. 3) leading to oscillation in the core. A complete model of the laser using equations for stimulated Raman scattering arc used to model the behavior of the visible laser diode pumped Raman laser. An example equation for stimulated Raman scattering may be found in M. Rini, et al., "Numerical modeling and optimization of Cascaded Raman fiber Lasers," IEEE Journal of Quantum Electron, vol. 36, pp. 117-1122 (2000), which is entirely incorporated herein by reference.

The evolution of the pump power into the single mode output for this case is shown in FIG. 6A and FIG. 6B. FIG. 6A shows the forward (6001) propagating and backward (6002) propagating single mode power in a 10 μm core as a function of the position in the resonator fiber oscillating at 460 nm. FIG. 6B shows the forward propagating (6011, 6012) and backward propagating (6021, 6022) pump signals in the 85 μm diameter clad as a function of the position in the resonator fiber. The forward propagating pumps includes two separate wavelengths at 450 nm (6011) and 452 nm (6012). Similarly, the backward propagating pump includes two separate wavelengths at 450 nm (6021) and 452 nm (6022). The outside clad which sets the pump clad numerical aperture at 0.49 is 125 μm in diameter. The single transverse mode output power for this example is greater than 2 kW using a 30% reflective output coupler (3005).

The laser output can be directly controlled by modulating the pump diodes or the laser can be configured as a master oscillator—power amplifier and the master oscillator can be modulated at high speed. Referring to FIG. 1, the laser beam passes through a pair of x-y scanners (1003) to translate the laser beam across the top of the substrate (1007), which is a powder bed in this example. The x-y scanners can be positioned either before or after the focusing objective (1005) depending on the focal length of the lens. The diameter of the spot (1006) that is formed is a function of the diameter of the collimated beam (1004) and the focal length of the objective lens (1005). A 70 μm diameter spot can be formed by a 158.4 cm focal length lens (62.4") if the input laser beam has a divergence of 44 μrad. A beam divergence of 44 μrad corresponds to an input beam diameter (1004) of 1.3 cm for a wavelength of 459 nm. This beam diameter is the result of a 22.6 cm focal length lens collimating (1002) the single mode output of the laser (1001) which is a mode diameter of 10 μm exiting the laser. The result is a system that can be scanned over a plane of 53"×53" of the substrate (1007). Combining this with a large displacement elevator (1008) allows for a build volume of 53"×53"×55".

The laser can be scanned over a bed of powder to define the part. The powder bed is rolled over the part after each layer is scanned and the elevator is decremented by 100 nm, giving a layer resolution of 100 nm. The powder is greater than 10 nm in diameter, greater than 50 nm in diameter but not greater than 100 nm in diameter for this particular example. The diameter of the powder can affect the surface roughness and the build speed of the part. The build speed of the part can be greater than or equal to about 50 cubic centimeters per hour using a 1 kW laser at 459 nm as shown in Table 2. This is over a factor of 2.5× faster than an IR laser and a factor of 150× build volume which represents a substantial improvement over the current technology.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for forming a part, the system comprising:
   a. a laser light source that generates a coherent beam of visible light having a wavelength greater than 400 nm and less than 750 nm and a power of at least about 100 W;
   b. an area for holding a metallic solid substrate, whereby the metallic solid substate is in optical communication with the coherent beam;
   c. a scanning module downstream of said laser light source, wherein said scanning module is adapted to generate a scanning motion of the coherent beam with respect to the area, which scanning motion corresponds to a predetermined pattern for the part; and,
   d. a computer control system operatively coupled to the laser light source and the scanning module, wherein the computer control system is configured to: (i) control the scanning motion; and (ii) control the power of the coherent beam at the area;
   e. wherein the system is configured for the coherent beam at the area to melt, soften or both the metallic solid substrate to thereby form the part from the metallic solid substrate.

2. The system of claim 1, wherein the metallic solid substrate comprises a powered selected from the group consisting of, aluminum, steel, titanium, copper, bronze, gold, nickel, and combinations and alloys of these materials.

3. The system of claim 1, wherein the wavelength is blue.

4. The system of claim 1, wherein the coherent beam power is greater than 200 W.

5. The system of claim 1, wherein the coherent beam power is greater than 500 W.

6. The system of claim 1, wherein the system is configured to form the part having a surface roughness of 0.1 nm to 50 nm.

7. The system of claim 2, wherein the system is configured to form the part having a surface roughness of 0.1 nm to 10 nm.

8. The system of claim 1, wherein the system is configured to form the part having a surface roughness of 0.1 nm to 50 nm and the coherent beam has an $M^2$ greater than 1.0 and a single transverse mode.

9. The systems of claim 2, wherein the coherent beam has an $M^2$ greater than 1.0 and a single transverse mode.

10. The system of claim 1, wherein the system has a focal plane at the area.

11. The system of claim 1, wherein the system is configured for the coherent beam at the area to have a spot size selected from the group consisting of 34 µm, 70 µm, and less than 1 µm.

12. The system of claim 1, wherein the control of the power of element d. (ii) comprises modulating the coherent beam.

13. The system of claim 12, wherein the modulation rate selected from the group consisting of 50 kHz, 100 kHz, 200 kHz, 300 kHz, 400 kHz, 500 kHz, 1 GHz, 2 GHz, 3 GHz, 4 GHz, 5 GHz, and 10 GHz.

14. The systems of claim 1, wherein the area defines a build volume, wherein the system is configured to provide a build speed, and wherein the system is configured to form the part having a surface quality; and wherein when compared to an IR wavelength coherent beam in the system, the system is configured such that at least one of: (i) the build speed is over 2.5×faster than with the IR wavelength; (ii) the build volume is over 9×larger than with the IR wavelength; (iii) and the surface quality is over 2×better than with the IR wavelength.

15. A system for forming a part, the system comprising:
   a. a laser light source comprises a plurality of laser diodes that generate a plurality of laser beamlets and a means to interface the plurality of laser beamlets to thereby provide a coherent beam of visible light having a wavelength greater than 400 nm and less than 750 nm;
   b. an area for holding a metallic solid substrate, whereby the metallic solid substate is in optical communication with the coherent beam, the coherent beam having a power of at least about 100 W at the area;
   c. a scanning module downstream of said laser light source, wherein said scanning module is adapted to generate a scanning motion of the coherent beam with respect to the area, which scanning motion corresponds to a predetermined pattern for the part; and,
   d. a computer control system operatively coupled to the laser light source and the scanning module, wherein the computer control system is configured to: (i) control the scanning motion; and (ii) control the power of the coherent beam at the area;
   e. wherein the system is configured for the coherent beam at the area to melt, soften or both the metallic solid substrate to thereby form the part from the metallic solid substrate.

16. The system of claim 15, wherein the metallic solid substrate comprises a powder selected from the group consisting of aluminum, steel, titanium, copper, bronze, gold, nickel, and combinations and alloys of these materials.

17. The system of claim 15, wherein the system is configured to provide a part having a surface roughness of 0.1 nm to 50 nm.

18. The system of claim 16, wherein the wavelength is blue.

19. The systems of claim 16, wherein the coherent beam power is greater than 500 W.

20. A system for forming a part, the system comprising:
   a. a laser light source that generates a coherent beam of blue light having a blue wavelength and a power of at least about 500 W;
   b. an area for holding a metallic solid substrate, whereby the metallic solid substate is in optical communication with the coherent beam; wherein the metallic solid substrate is selected from the group consisting of aluminum, steel, titanium, copper, bronze, gold, nickel, and alloys of these materials;
   c. a scanning module downstream of said laser light source, wherein said scanning module is adapted to generate a scanning motion of the coherent beam with respect to the area, which scanning motion corresponds to a predetermined pattern; and,
   d. a computer control system operatively coupled to the laser light source and the scanning module, wherein the computer control system is configured to: (i) control the scanning motion; and (ii) modulate the coherent beam at the area;
   e. wherein the system is configured for the coherent beam at the area to melt, soften or both the metallic solid substrate to thereby form the part from the metallic solid substrate; and,
   f. wherein the system defines a build volume, wherein the system is configured to provide a build speed, and wherein the system is configured to form the part having a surface quality; and wherein when compared to an IR wavelength coherent beam in the system, the system is configured such that at least two of: (i) the build speed is over faster than with the IR wavelength; (ii) the build volume is larger than with the IR wavelength; (iii) and the surface quality is better than with the IR wavelength.

21. The system of claim 20, wherein the laser light source comprises a plurality of laser diodes that generate a plurality of laser beamlets and a means to interface the plurality of laser beamlets to thereby provide the coherent beam of blue light.

* * * * *